United States Patent [19]

Sorrow

[11] Patent Number: 5,245,786
[45] Date of Patent: Sep. 21, 1993

[54] PYRAMIDING PLANTER APPARATUS

[76] Inventor: Leroy Sorrow, Rte. 2, Box 45 North, Hodges, S.C. 29653

[21] Appl. No.: 744,302

[22] Filed: Aug. 13, 1991

[51] Int. Cl.$^5$ .............................................. A01G 9/02
[52] U.S. Cl. ..................................... 47/82; 47/33
[58] Field of Search ................ 47/82, 83, 33; 405/284

[56] References Cited

U.S. PATENT DOCUMENTS

| | | | |
|---|---|---|---|
| 197,406 | 11/1877 | Reinecke | 47/83 |
| 440,141 | 11/1890 | Dearborn | 47/83 |
| 1,752,597 | 4/1930 | Jackson | 47/83 |
| 2,756,541 | 7/1956 | Berger | 47/83 |
| 3,137,095 | 6/1964 | Pearson | 47/83 |

FOREIGN PATENT DOCUMENTS

| | | | |
|---|---|---|---|
| 3539460 | 5/1987 | Fed. Rep. of Germany | 47/82 |
| 84938 | 5/1965 | France | 47/83 |
| 2479650 | 10/1981 | France | 47/83 |

*Primary Examiner*—Henry E. Raduazo
*Attorney, Agent, or Firm*—Hardaway Law Firm

[57] ABSTRACT

A novel pyramiding planter apparatus is provided comprising a plurality of vertically spaced tiers comprising elongated panels and defining a central area therethrough, the vertically spaced tiers being supportedly connected to one another by a plurality of support brackets such that the tiers are spacedly positioned above one another in a pyramiding fashion thereby having open areas therebetween and a common central vertical axis.

2 Claims, 2 Drawing Sheets

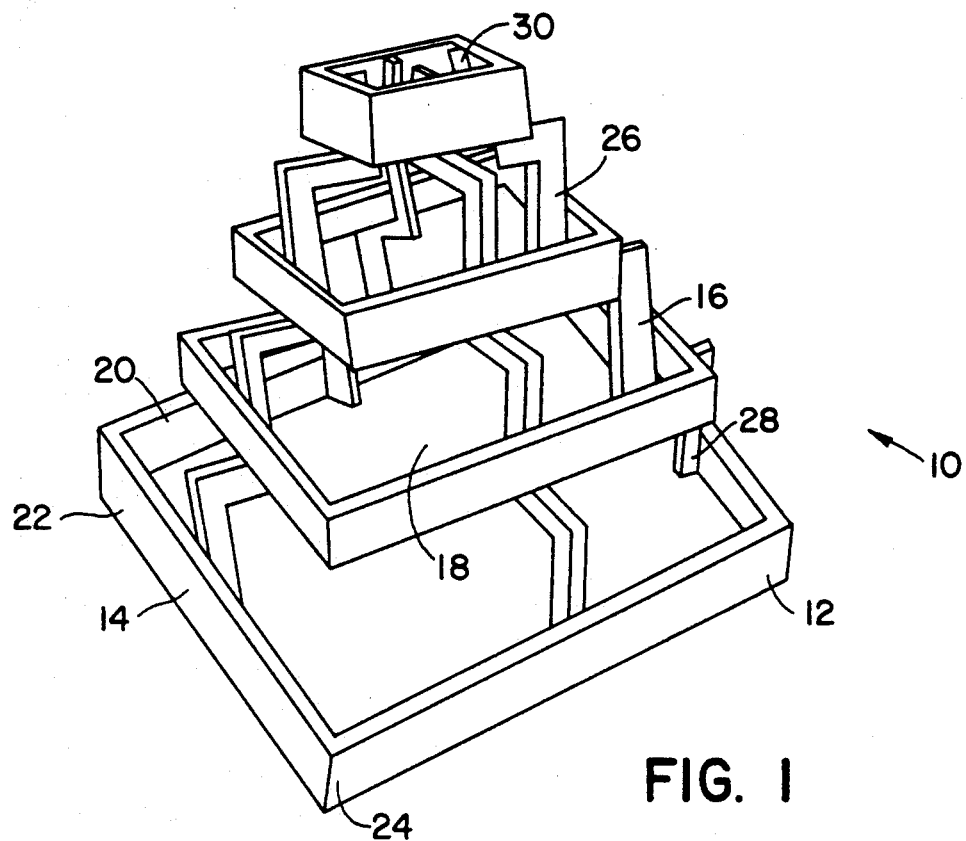
FIG. 1
FIG. 2
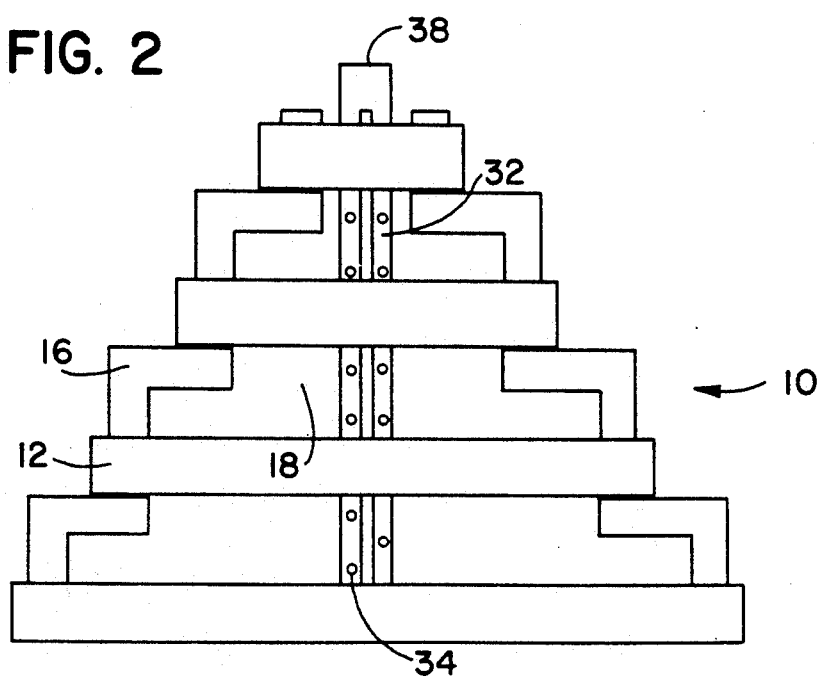

PYRAMIDING PLANTER APPARATUS

BACKGROUND OF THE INVENTION

This invention relates generally to the art of agricultural equipment and more particularly to a planter apparatus for growing plants.

Various devices exist within the agricultural arena for growing plants such as garden crops and even flowers. It is well known in the art to use a "raised-bed" structure for growing such plants, as such structures have several distinct advantages over the conventional type of gardening and/or flowering. This "raised-bed" method involves building some enclosure, filling that enclosure with soil, and planting crops and/or flowers in the soil. Various structures for such an enclosure exist within the prior art, and it is the structures themselves that distinguish each of the prior art patents.

While the prior art devices exhibit some advantages for their intended purposes, much room for improvement exists within the art of planter apparatuses.

SUMMARY OF THE INVENTION

It is thus an object of this invention to provide a novel planter apparatus.

It is still a further object of this invention to provide such a novel planter apparatus which is easily assembled and disassembled.

It is still a further object of this invention to provide such a novel planter apparatus which can be easily and conveniently used to grow garden crops and/or flowers.

It is yet a further object of this invention to provide such a novel planter apparatus which enables the soil contained therein to be quickly and easily irrigated.

It is yet a further object of this invention to provide such a novel planter apparatus which is structurally durable over repeated periods of use.

These as well as other objects are accomplished by a pyramiding planter apparatus comprising a plurality of vertically spaced tiers with each of the tiers comprising elongated panels and defining a central area therethrough. A plurality of support brackets supportedly connects the plurality of vertically spaced tiers. Each of the vertically spaced tiers defines a different central area therein, and the tiers are supportedly connected by the plurality of support brackets such that the tiers are spacedly positioned above one another in a pyramiding fashion, thereby having open areas therebetween and common central vertical axis.

BRIEF DESCRIPTION OF THE DRAWINGS

FIG. 1 is a perspective view of the planter apparatus according to the present invention.

FIG. 2 is a side view of the planter apparatus according to the present invention having conduit means therein.

DETAILED DESCRIPTION

Figure 3:
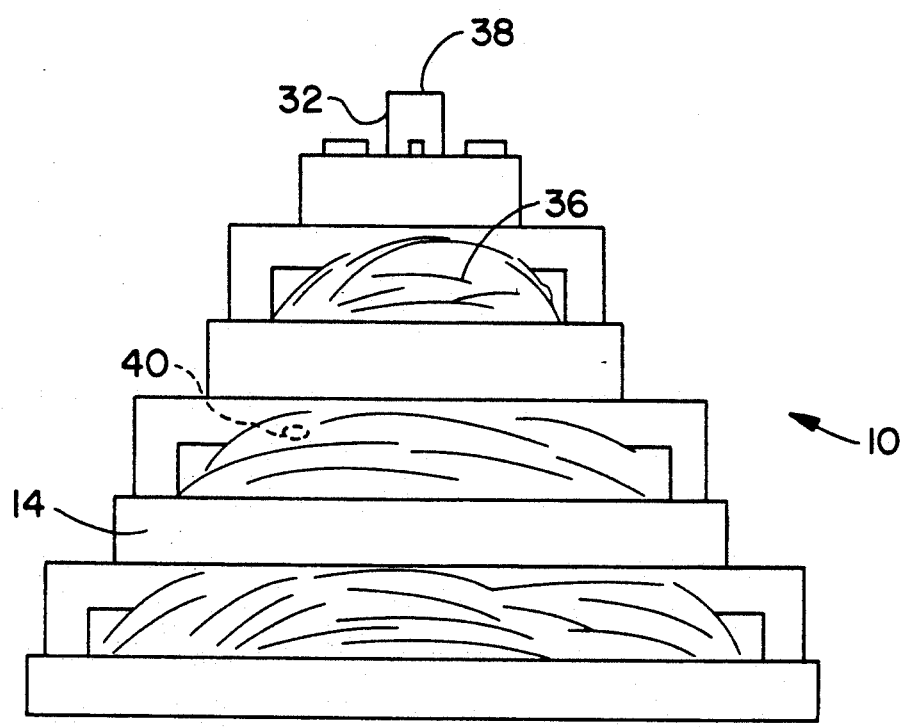
FIG. 3 is a side view of the planter apparatus having soil therein according to the present invention.

In accordance with this invention it has been found that a novel planter apparatus for containing soil can be provided. This planter apparatus is easily assembled to form a pyramiding structure and can be easily and conveniently used to grow garden crops and/or flowers therein. It has also been found that such a novel planter apparatus can be provided which enables soil contained therein to be easily and quickly irrigated. Finally, it has been found that such a novel planter apparatus can be provided which is structurally durable over extended periods of use.

Various other advantages and features will become apparent from a reading of the following description given with reference to the various figures of drawings.

FIG. 1 is a perspective view of the pyramiding planter apparatus 10 according to the present invention. As illustrated, pyramiding planter apparatus 10 comprises a plurality of vertically spaced tiers 12. Vertically spaced tiers 12 comprise elongated panels 14 and define a central area therethrough. Each of the vertically spaced tiers 12 defines a different central area therethrough, such difference resulting from the various size differences of each of the vertically spaced tiers 12. Support brackets 16 supportedly connect vertically spaced tiers 12 such that tiers 12 are spacedly positioned above one another in a pyramiding fashion with each of the vertically spaced tiers 12 having a common central vertical axis, as shown in FIG. 1. By this pyramiding configuration, vertically spaced tiers 12 have open areas therebetween in addition to defining central areas through each vertically spaced tier 12. The central areas of the vertically spaced tiers 12 combine with the open areas that exist between the spaced tiers 12 to form a large inner area for receiving soil therein, designated as area 18.

In the preferred embodiment, each of the plurality of vertically spaced tiers 12 comprises four elongated panels 14 which are connectedly adjoined to form a square box. Each of the panels 14 comprises an inner face 20, an outer face 22, and two ends 24 which are opposite one another. Panels 14 may be constructed from a variety of materials in the preferred embodiment, including fiberglass, wood, and aluminum.

Also illustrated in FIG. 1 is the preferred embodiment of support brackets 16. As illustrated, support brackets 16 comprise four separate lengths of connected brackets. For illustration purposes, bracket length 26 extends from point 28 to point 30. In this preferred embodiment, each bracket length 26 extends in a zig-zag fashion supportedly connecting vertically spaced tiers 12. Each support bracket 16 supportedly connects to a panel 14 of a vertically spaced tier 12 at the approximate center of panel 14, as illustrated in FIG. 1.

FIG. 2 is a side view of the pyramiding planter apparatus 10 according to the present invention having conduit means 32 therein. Pyramiding planter apparatus 10 is shown as comprising vertically spaced tiers 12 which are supportedly connected by support brackets 16. Vertically spaced tiers 12 define a central area therethrough, as illustrated in FIG. 1. Additionally, the spacing of vertically spaced tiers 12 in a pyramiding fashion provides open areas between tiers 12. The central areas of tiers 12 combine with the open areas between tiers 12 to form a large inner area 18 for receiving soil therein. In the preferred embodiment, conduit means 32 extends centrally through inner area 18 and is designed to distribute a liquid to soils contained by pyramiding planter apparatus 10. Conduit means 32 in a preferred embodiment comprises a vertical tube which is generally positioned at the common central vertical axis of vertically spaced tiers 12. Conduit means 32 defines an opening 38 and a plurality of perforations 34 therein for distributing liquid to soil contained by pyramiding planter apparatus 10.

FIG. 3 is a side view of planter apparatus 10 having soil 36 therein. The soil 36 is contained within the inner area 18, which is best see in FIGS. 1 and 2. Soil 36 is packed around conduit means 32, and panels 14 generally maintain and provide boundaries for soil 36. Panels 14 may be constructed of a variety of materials, as discussed above, and panels 14 may also vary in height. It has been found in the preferred embodiment of the invention that a height of 7 inches for panels 14 is ideal for containing as much soil as possible within planter apparatus 10 while simultaneously making access to soil 36 simple and convenient.

In accordance with this invention a preferred process of filling pyramiding planter apparatus 10 is disclosed. In this preferred embodiment, the inner area 18 (seen in FIGS. 1 and 2) is filled with soil. Water is then poured in conduit means 32, which ideally comprises a vertical tube, through opening 38 in conduit means 32. Soil 36 should then be allowed to settle, preferably for a few hours, and then more soil 36 can be added to planter apparatus 10. Once again, conduit means 32 should be used to saturate and condense soil 36 until the desired amount of soil exists within planter apparatus 10. Once the desired amount of soil 36 is obtained within planter apparatus 10, seeds such as seed 40 seen in partial phantom in FIG. 3, can be planted in soil 36.

In its preferred embodiment, pyramiding planter apparatus 10 can easily and conveniently be used to grow crops and/or flowers from seeds such as seed 40. Watering seeds such as seed 40 in soil 36 is easily and simply accomplished by conduit means 32. Water can be poured into the top 38 of conduit means 32, thereby allowing water to pass through perforations 34 (seen in FIG. 2) which are defined by conduit means 32. In this manner, water and/or other liquids can be easily distributed through soil 36 within planter apparatus 10.

At the end of a season or period of use, it is envisioned that planter apparatus 10 can be easily disassembled, thereby permitting soil 36 to be easily accessed for moving or disposal. It is also envisioned that planter apparatus 10 can be partially disassembled for simpler access to crops that grow in soil 36, such as potatoes and carrots. Planter apparatus 10 can be stored and later easily re-assembled for use again when desired.

It is thus seen that the present invention provides a novel planter apparatus. It is also seen that the present invention provides such a novel planter apparatus which is easily assembled and disassembled and which can be easily and conveniently used to grow garden crops and/or flowers therein. It is further seen that the present invention provides such a novel planter apparatus which enables soil contained therein to be quickly and easily irrigated. It is still further seen that the present invention provides such a novel planter apparatus which is structurally durable over extended periods of use. Many variations are apparent to those of skill in the art, and such variations are embodied within the spirit and scope of the present invention as measured by the following appended claims.

That which is claimed:

1. A process of filling a pyramiding planter apparatus comprising the steps of:

providing a pyramiding planter apparatus comprising;

a plurality of vertically spaced tiers, each of said tiers comprising elongated panels and defining a central area therethrough, a plurality of support brackets supportedly connecting said plurality of vertically spaced tiers, each of said vertically spaced tiers defining a different central area therein and said tiers being supportedly connected by said plurality of support brackets such that said tiers are spacedly positioned above one another in a pyramiding fashion thereby having open area therebetween and a common central vertical axis, whereby said central areas of said plurality of vertically spaced tiers combine with said open areas between said tiers to form a large inner area for receiving soil therein, said plurality of support brackets spacedly arranged so each of said elongated panels of said vertically spaced tiers has one support bracket connected thereto providing substantial unobstructed exposure of said large inner area for receiving soil;

conduit means extending through said inner area for distributing a liquid therein, filling said inner area of said pyramiding planter apparatus with soil;

pouring water into said conduit to thereby saturate and condense said soil;

re-filling said inner area with soil until said inner area and said plurality of tiers are substantially filled with soil; and pouring water into said conduit means to again saturate and condense said soil.

2. The process of filling a pyramiding planter apparatus according to claim 1 further comprising the step of planting seeds in said soil.

* * * * *